US008448743B2

United States Patent
Tanno et al.

(10) Patent No.: US 8,448,743 B2
(45) Date of Patent: May 28, 2013

(54) TIRE NOISE REDUCTION DEVICE AND PNEUMATIC TIRE PROVIDED THEREWITH

(75) Inventors: Atsushi Tanno, Hiratsuka (JP); Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 460 days.

(21) Appl. No.: 12/422,605

(22) Filed: Apr. 13, 2009

(65) Prior Publication Data

US 2009/0277553 A1 Nov. 12, 2009

(30) Foreign Application Priority Data

May 9, 2008 (JP) ................................. 2008-124019
Feb. 23, 2009 (JP) ................................. 2009-039555

(51) Int. Cl.
*B60C 19/00* (2006.01)
*B60C 5/00* (2006.01)

(52) U.S. Cl.
USPC ............................. 181/207; 152/157; 152/504

(58) Field of Classification Search
USPC ... 152/155, 157, 158, 502–506, 509; 181/207
IPC .......................... B60C 5/14,19/12; B29C 73/22
See application file for complete search history.

(56) References Cited

U.S. PATENT DOCUMENTS

| 7,387,141 | B2 * | 6/2008 | Tanno et al. .................. 152/155 |
| 7,735,532 | B2 * | 6/2010 | Tanno et al. .................. 152/157 |
| 2005/0155686 | A1 * | 7/2005 | Yukawa et al. ............... 152/450 |
| 2007/0137752 | A1 | 6/2007 | Agostini |
| 2008/0099116 | A1 | 5/2008 | Tanno |

FOREIGN PATENT DOCUMENTS

| EP | 1 714 802 | | 10/2006 |
| JP | 2006-044503 | | 2/2006 |
| JP | A 2006-224928 | | 8/2006 |
| JP | 2007137253 A | * | 6/2007 |
| JP | A 2007-237962 | | 9/2007 |
| WO | WO2005/012005 | * | 2/2005 |

* cited by examiner

*Primary Examiner* — Justin Fischer
*Assistant Examiner* — Philip N Schwartz
(74) *Attorney, Agent, or Firm* — Greer, Burns & Crain, Ltd.

(57) ABSTRACT

Provided are a tire noise reduction device allowing rapid and reliable puncture-repair of a pneumatic tire provided with an annular sound absorbing member on the inner surface of a tread portion of the tire, and a pneumatic tire provided with the tire noise reduction device. The tire noise reduction device includes: the annular sound absorbing member made of a porous material; and a repair liquid permeable layer stacked on an outer peripheral surface of the sound absorbing member. The repair liquid permeable layer has many continuous pores and has a flow resistance lower than that of the porous material. The tire noise reduction device is mounted on the inner peripheral surface of a tread portion of the pneumatic tire.

11 Claims, 3 Drawing Sheets

TIRE NOISE REDUCTION DEVICE AND PNEUMATIC TIRE PROVIDED THEREWITH

BACKGROUND OF THE INVENTION

1. Field of the Invention

The present invention relates to a tire noise reduction device and a pneumatic tire provided with the tire noise reduction device. More particularly, the present invention relates to a tire noise reduction device allowing rapid and reliable puncture-repair of a punctured pneumatic tire provided with a sound absorbing member on the inner surface of a tread portion of the tire and relates to a pneumatic tire provided with the tire noise reduction device.

2. Description of the Prior Art

In a pneumatic tire, a resonant sound is caused during travel because of vibration of the air in the cavity of the tire. It is known that the resonant sound caused in the cavity causes discomfort to people as noise. Conventionally, techniques have been known in which a sound absorbing member made of a porous material is arranged on the inner surface of a tread portion of a tire in order to reduce the cavity resonance noise generated in the cavity of the tire. (For example, refer to Japanese patent application Kokai publication Nos. 2006-224928 and 2007-237962.)

Meanwhile, as a method for repairing a tire having a through-hole in a tread portion thereof formed when the tire runs over a nail or the like during travel, a method has been implemented in which a puncture repair liquid is injected through an air pressure valve and the repair liquid is caused to flow into the through-hole with the action of air pressure to thereby seal the through-hole.

However, in the tire with the sound absorbing member arranged on the inner surface of the tread portion described above, a sound absorbing member 2 impedes the flow of a repair liquid 6 into a through-hole A as shown in FIG. 6. Accordingly, there arises a problem in that smooth puncture repair operation cannot be performed. Here, consider a case where the tip of a foreign matter such as a nail B does not penetrate to the inner peripheral surface of the sound absorbing member 2 as shown in FIG. 6, and a case where, even though the nail B penetrates to the inner peripheral surface of the sound absorbing member 2, the injected repair liquid 6 does not flow into the through-hole in the inner peripheral surface of the sound absorbing member 2. Especially in these cases, although the repair liquid 6 is impregnated into a porous part of the sound absorbing member 2, the repair liquid 6 does not readily flow into the through-hole A, thereby causing a problem in that repair operation of the puncture hole takes time.

SUMMARY OF THE INVENTION

An object of the present invention is to provide a tire noise reduction device allowing rapid and reliable puncture-repair of a punctured pneumatic tire provided with a sound absorbing member on the inner surface of a tread portion of the tire and to provide a pneumatic tire provided with the tire noise reduction device.

A tire noise reduction device of the present invention to achieve the above object is a tire noise reduction device to be mounted on an inner surface of a tread portion of a tire, the tire noise reduction device including: a sound absorbing member made of a porous material and having an annular shape; and a repair liquid permeable layer stacked on an outer peripheral surface of the sound absorbing member. In the tire noise reduction device, the repair liquid permeable layer has many continuous pores and has a flow resistance lower than that of the porous material.

In addition, the tire noise reduction device of the present invention preferably has one or more characteristics as described in the following items (1) to (7):

(1) A porosity of the repair liquid permeable layer is set to 60.0 to 99.5%.
(2) A thickness of the repair liquid permeable layer is set to 1.0 to 10 mm.
(3) The repair liquid permeable layer is divided into multiple sections arranged at predetermined intervals in a circumferential direction of the sound absorbing member.
(4) The repair liquid permeable layer is subjected to a hydrophilic treatment.
(5) The sound absorbing member is subjected to a water repelling treatment.
(6) The sound absorbing member is divided into multiple separated bodies in a circumferential direction of the annular-shape, and the separated bodies are arranged in the circumferential direction at predetermined intervals.
(7) The sound absorbing member is fixed so as to be held by an annular elastic band.

Meanwhile, a pneumatic tire of the present invention includes the aforementioned tire noise reduction device mounted on the inner peripheral surface of a tread portion. As for a method for providing the tire noise reduction device on the inner peripheral surface of the tread portion, the tire noise reduction device may be attached by pressure, i.e., elastic force thereof, attached by pressure, i.e., elastic force of the elastic band, or bonded with an adhesive.

According to the aforementioned tire noise reduction device of the present invention, the repair liquid permeable layer having many continuous pores and having a flow resistance lower than that of the porous material is stacked on the outer peripheral surface of the sound absorbing member made of the porous material. Accordingly, when the tire noise reduction device is mounted on the inner peripheral surface of a tread portion of a tire, a puncture repair liquid injected through an air pressure valve can readily flow through the repair liquid permeable layer with the action of air pressure. Thus, the puncture repair liquid can be spread evenly between the inner surface of the tread portion and the outer peripheral surface of the sound absorbing member. As a result, the puncture repair liquid more readily flows into a through-hole formed in the inner surface of the tread portion, and then seals the through-hole as the puncture repair liquid cures. Therefore, a rapid and reliable puncture-repair operation can be performed.

DESCRIPTION OF THE PREFERRED EMBODIMENT

Hereinafter, an embodiment of the present invention will be described in detail with reference to the accompanying drawings.

Figure 1:
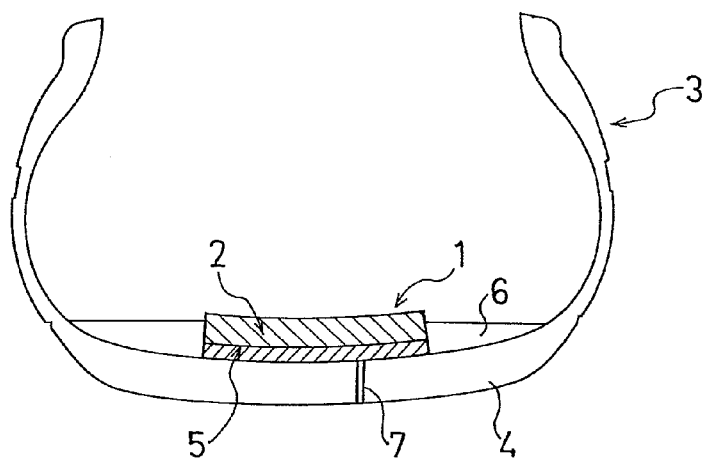
FIG. 1 is a schematic cross-sectional view showing a tire noise reduction device according to an embodiment of the present invention mounted on the inner surface of a pneumatic tire.

A tire noise reduction device 1 of the embodiment of the present invention shown in FIG. 1 includes a sound absorbing member 2 made of a porous material and having an annular shape. The tire noise reduction device 1 is mounted on the inner surface of a tread portion 4 of a pneumatic tire 3. In the tire noise reduction device 1, a repair liquid permeable layer 5 is stacked on an outer peripheral surface of the annular sound absorbing member 2. The repair liquid permeable layer 5 is made of a material having many continuous pores and has a flow resistance which is lower than that of the porous material forming the sound absorbing member 2.

With this structure, a puncture repair liquid 6 injected through an air pressure valve readily flows to the side of the repair liquid permeable layer 5 rather than the side of the sound absorbing member 2 with the action of air pressure. As a result, the puncture repair liquid 6 is evenly spread between the inner surface of the tread portion 4 and the sound absorbing member 2. Accordingly, the puncture repair liquid 6 flows and is filled into a through-hole 7 which is opened to the inner surface of the tread portion 4. Then, the puncture repair liquid 6 cures to seal the through-hole 7.

The material forming the repair liquid permeable layer 5 is not particularly limited as long as the material has many continuous pores. Examples of the material include: resin foams made of, for example, polyurethane resins; rubber foams; assemblies of plant fibers such as loofah fibers and coconut shell fibers; fiber assemblies such as a non-woven fabric made of an organic fiber; and any kinds of cellulose foam.

The porosity of the repair liquid permeable layer 5 is preferably 60.0 to 99.5%, and more preferably 65 to 99%. The porosity in this range allows the repair liquid 6 to more smoothly flow into the through-hole 7. Thus, the through-hole 7 can be more rapidly and reliably sealed. If the porosity falls below 60%, the amount of the pore part in the repair liquid permeable layer 5 is insufficient. This makes it difficult for the repair liquid 6 to flow through the repair liquid permeable layer 5. On the other hand, if the porosity exceeds 99.5%, the compressive rigidity of the repair liquid permeable layer 5 is insufficient. As a result, the repair liquid permeable layer 5 is compressed and deformed with the air pressure, thereby making it difficult for the repair liquid 6 to flow through the repair liquid permeable layer 5.

The porosity of the repair liquid permeable layer 5 can be obtained from the following formula:

$$\text{Porosity}(\%) = (1 - d_1/d_0) \times 100$$

(where $d_0$ represents the density of the material (g/cm$^3$); $d_1$ represents the apparent density (g/cm$^3$)).

Here, $d_0$ can be obtained by the density gradient-tube method specified in JIS L 1013.

In addition, when the repair liquid permeable layer 5 is made of a resin foam or a rubber foam, the cell number, specified in JIS K 6400-1, of the repair liquid permeable layer 5 is preferably set to be in a range of 5 to 30 cells/25 mm$^2$.

The thickness of the repair liquid permeable layer 5 is preferably set to 1.0 to 10 mm, more preferably set to 1.2 to 8 mm, and further preferably set to 1.5 to 5 mm. When the thickness of the repair liquid permeable layer 5 is set within such a range, smooth flow of the repair liquid 6 can be guaranteed, while increase in tire weight is suppressed.

The repair liquid permeable layer 5 may be subjected to a hydrophilic treatment in advance. With this treatment, the repair liquid 6 can more readily flow into the side of the repair liquid permeable layer 5 rather than the side of the sound absorbing member 2. This hydrophilic treatment may be performed by adding any one of a penetrant, other wetting agents and a surfactant into a material forming the repair liquid permeable layer 5. For example, a penetrant mainly containing polyoxyethylene alkyl ether, sodium dioctylsulfosuccinate or the like may be added.

Meanwhile, the repair liquid permeable layer 5 may be subjected to a water repelling treatment in some cases, as similar to the case of the sound absorbing member to be described later. It is recommended that no water repelling treatment of the repair liquid permeable layer 5 be performed. However, the repair liquid permeable layer 5 may be subjected to the water repelling treatment depending on the material forming the liquid permeable layer 5. In this case, the weight of a water repellent added to the repair liquid permeable layer 5 per unit volume is preferably set to 50% or less, and more preferably 40% or less, of the weight of the water repellent added to the sound absorbing member 2 per unit volume. Note that the weight of the water repellent may be measured as an extracted amount with n-hexane used as an extraction solvent.

Figure 2:
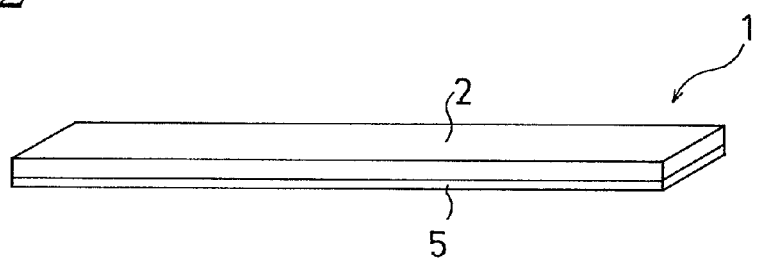
FIG. 2 is a partial perspective view showing the tire noise reduction device according to the embodiment of the present invention spread flat.

As shown in FIG. 2, the tire noise reduction device 1 has a structure in which the repair liquid permeable layer 5 is stacked on the outer peripheral surface (lower side in FIG. 2) of the annular sound absorbing member 2. The repair liquid permeable layer 5 can be stacked and fixed on the outer peripheral surface of the sound absorbing member 2 by an ordinary method such as pasting with an adhesive or by thermal welding; mechanical fixation; fixation with a staple; or fixation with a fastener.

Figure 3A:
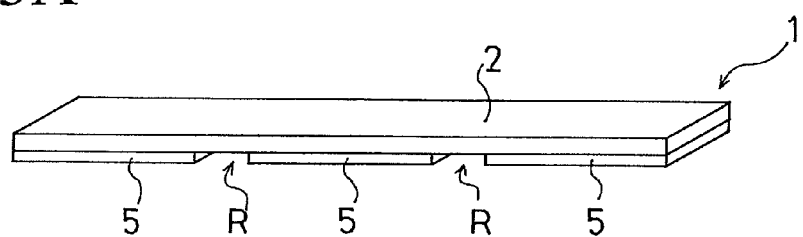
FIGS. 3A and 3B are perspective views each exemplifying another mode of the embodiment of the present invention and corresponding to FIG. 2.

In addition to the structure in which the repair liquid permeable layer 5 is stacked all over the outer peripheral surface of the sound absorbing member 2 in the circumferential direction as shown in FIG. 2, the tire noise reduction device 1 may have a structure in which the repair liquid permeable layer 5 is divided into multiple separated bodies, and the separated bodies are arranged in the circumferential direction of and on the outer peripheral side of the sound absorbing member 2 at predetermined intervals as shown in FIG. 3A. With this structure, the separated bodies of the repair liquid permeable layer 5 function as spacers interposed between the sound absorbing member 2 and the inner surface of a tire. To be more specific, spacious interspaces R are formed so as to be arranged at predetermined intervals in the circumferential direction and to extend in the tire-width direction between the sound absorbing member 2 and the inner surface of the tire. This allows the repair liquid 6 to flow along the interspaces R, thereby enabling the through-hole 7 to be effectively sealed. Particularly because the air pressure valve through which the repair liquid 6 is injected into the cavity of a tire is generally located on one side in the tire-width direction, the structure as shown in FIG. 3A is effective from the viewpoint of preventing the injected repair liquid 6 from being unevenly spread on the side, in the tire-width direction, of the air pressure valve.

Figure 3B:
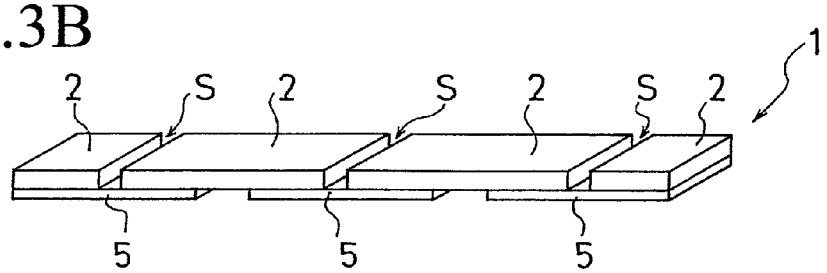

Furthermore, the tire noise reduction device 1 may have a structure as shown in FIG. 3B. Specifically, the sound absorbing member 2 may be divided into multiple separated bodies in the circumferential direction as similar to the repair liquid permeable layer 5 which is divided into the multiple separated bodies. Then, the multiple separated bodies of the sound absorbing member 2 and the multiple separated bodies of the repair liquid permeable layer 5 are alternately arranged in the circumferential direction at predetermined intervals. With this structure, in addition to the interspaces R, interspaces S extending in the tire-width direction are formed between every adjacent two of the separated bodies of the sound absorbing member 2, thereby allowing the repair liquid 6 to more smoothly flow in the tire-width direction.

The surface of the sound absorbing member 2 may be subjected to water repelling treatment in advance. This treatment ensures weatherability of the sound absorbing member 2, thereby preventing early degradation of the sound absorbing member 2. In addition, this treatment reduces the amount of the repair liquid 6 impregnated into the sound absorbing member 2 as much as possible, and thus makes the repair liquid 6 more readily flow into the side of the repair liquid permeable layer 5, thereby making it possible to further efficiently seal the through-hole 7.

The water repelling treatment may be performed by adding a water repellent into the porous material forming the sound absorbing member 2. Examples of the water repellent include waxes, metallic soaps, alkylpyridinium halides, silicones, fluorine compounds. When the sound absorbing member 2 is made of a polyurethane resin foam, the water repellent may be incorporated into the resin at the time of producing (foaming) the polyurethane foam.

The tire noise reduction devices 1 shown in FIG. 2, FIGS. 3A and 3B are each mounted on the inner surface of the tread portion 4 of a tire in such a manner that the tire noise reduction device 1 is attached by pressure, i.e., elastic force of the sound absorbing member 2 and the repair liquid permeable layer 5. In addition to this mounting method, the repair liquid permeable layer 5 may be bonded on the inner surface of the tread portion 4 with an adhesive or the like, if necessary. The adhesion of the repair liquid permeable layer 5 on the inner surface of the tread portion 4 ensures the stability of the tire noise reduction device 1 on the inner surface of the tread portion 4, thereby improving both the uniformity of a tire and the durability of the tire noise reduction device 1.

Figure 4A:
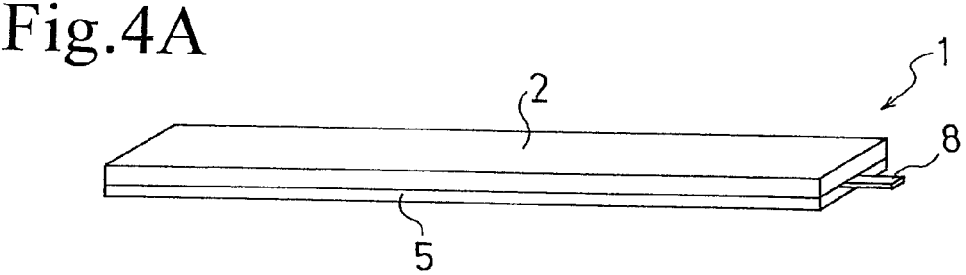
FIGS. 4A to 4C are perspective views each exemplifying still another mode of the embodiment of the present invention and corresponding to FIG. 2.
Figure 4B:
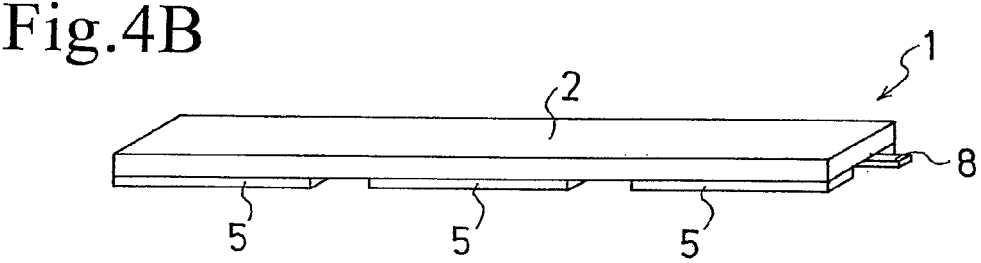
Figure 4C:
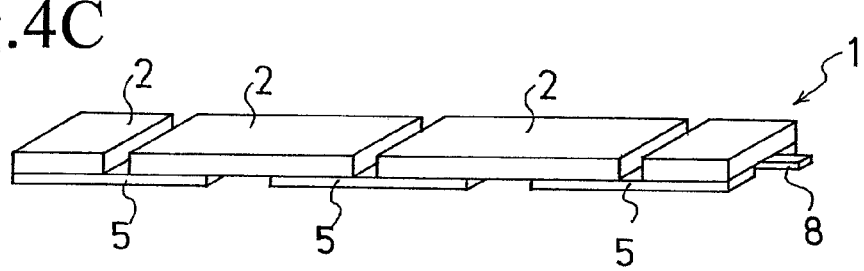

Meanwhile, as shown in FIGS. 4A to 4C, the tire noise reduction device 1 may have a structure in which the sound absorbing member 2 of the tire noise reduction device 1 is connected to an annular elastic band 8, and is attached by pressure on the inner surface of the tread portion 4 with elastic force of the elastic band 8. FIG. 4A shows an example of the tire noise reduction device 1 having a structure in which the elastic band 8 is sandwiched between the sound absorbing member 2 and the repair liquid permeable layer 5. Meanwhile, FIGS. 4B and 4C show examples of the tire noise reduction device 1 having a structure in which each of the separated bodies of the repair liquid permeable layer 5 is divided into two pieces in the tire-width direction, and the elastic band 8 is placed between the two pieces. This structure improves the durability of the elastic band 8, while allowing easy attaching and detaching operation of the tire noise reduction device 1. This is because the elastic band 8 is protected from external impact force by cushioning effect of the sound absorbing member 2.

Figure 5A:
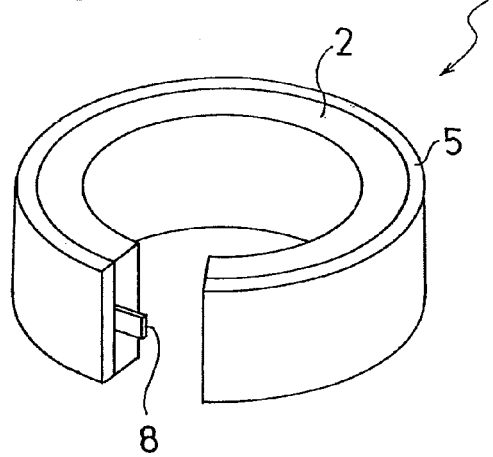
FIGS. 5A and 5B are cutaway perspective views each showing a tire noise reduction device exemplifying yet another mode of the embodiment of the present invention.
Figure 5B:
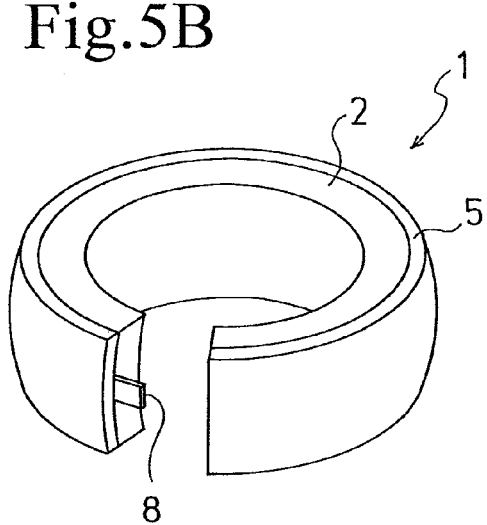

FIGS. 5A and 5B are each a cut-away perspective view of the tire noise reduction device 1 in which the elastic band 8 is arranged between the sound absorbing member 2 and the repair liquid permeable layer 5. Both the sound absorbing member 2 and the repair liquid permeable layer 5 are annular, and the annular elastic band 8 is sandwiched therebetween. In this case, the outer peripheral surface of the repair liquid permeable layer 5 may be formed into a shape which is curved in the tire-width direction as shown in FIG. 5B so as to conform to the shape of the inner surface of the tread portion 4. This allows the tire noise reduction device 1 to be more accurately mounted on the inner surface of the tread portion 4, and thus is advantageous in ensuring a good uniformity.

The material of the elastic band 8 is not particularly limited; however, the elastic band 8 may be made of rubber or resin. Young's modulus of the material is preferably in a range of 300 to 3000 MPa, and more preferably in a range of 500 to 2000 MPa. With the Young's modulus in this range, the position of the tire noise reduction device 1 can be stabilized on the inner surface of the tread portion 4, thereby ensuring a good uniformity. If the Young's modulus falls below 300 MPa, uniformity may become low. On the other hand, if the Young's modulus exceeds 3000 MPa, the deformation of the tire noise reduction device 1 cannot conform to the bending deformation of a tire, thereby decreasing durability.

The pneumatic tire 3 of the present invention has the tire noise reduction device 1 mounted on the inner peripheral surface of the tread portion 4. When the pneumatic tire 3 with this structure runs over a nail or the like during travel and thus a through-hole 7 is formed in the tread portion 4, the puncture repair liquid 6 is injected through the air pressure valve. The injected puncture repair liquid 6 is spread evenly on the inner peripheral surface of the tread portion 4, and thereby more readily flows into the through-hole 7. Therefore, a rapid and reliable puncture-repair operation becomes possible.

In the tire noise reduction device of the present invention, the repair liquid permeable layer having many continuous pores and a flow resistance lower than that of the porous material is provided on the outer peripheral surface of the sound absorbing member made of a porous material. As a result, workability in puncture-repair of the tire is enhanced while weight increase of the tire is suppressed. Accordingly, a pneumatic tire provided with the tire noise reduction device on the inner peripheral surface of a tread portion is capable of repairing rapidly and reliably a through-hole formed in a case where the tire runs over a nail or other cases. Thus, the pneumatic tire provided with the tire noise reduction device can be widely applied to vehicles which are not mounted with a spare tire.

EXAMPLES

Figure 6:
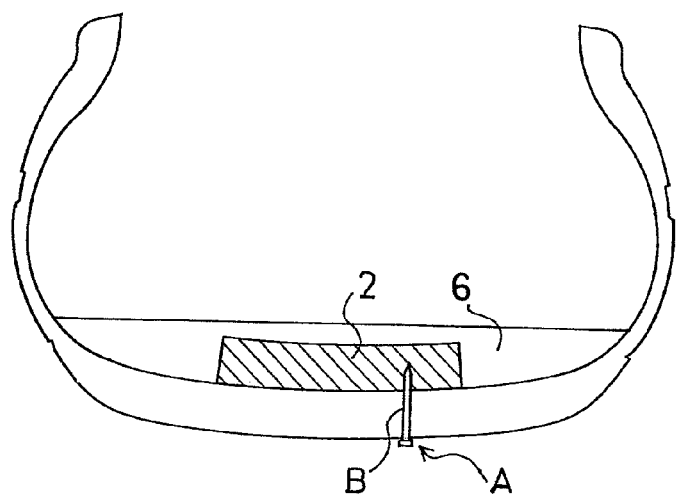
FIG. 6 is a schematic cross-sectional view showing a conventional tire noise reduction device mounted on the inner surface of a pneumatic tire.

Tires for comparison (Comparative Examples 1 and 2) and tires of the present invention (Example 1) were produced. All of the tires had a size of 215/60R15 in common. In each of the tires of Comparative Example 1, a tire noise reduction device included a sound absorbing member alone as shown in FIG. 6, and was mounted on the inner surface of a tread portion of the tire by adhesion. In each of the tires of Comparative Example 2, a tire noise reduction device having the same structure as that in Comparative Example 1 was mounted on the inner surface of a tread portion of the tire by attaching by pressure instead of adhesion. In each of the tires of Example 1, a tire noise reduction device having a repair liquid permeable layer stacked on an outer peripheral surface of a sound absorbing member as shown in FIG. 1 was mounted on the inner surface of a tire by attaching by pressure instead of adhesion.

Note that, among tires of each of Example and Comparative Examples, the specifications of the pneumatic tires and the sound absorbing members were the same, except for the presence or absence of the repair liquid permeable layer. In addition, the repair liquid permeable layer in the tire of the present invention (Example 1) was formed of a polyurethane resin foam and had a thickness of 5 mm, and a porosity of 85%.

Each of the tires of the three kinds was inflated to an air pressure of 210 kPa, and a nail of 30 mm in length was struck into the tread surface of the tire at a point 30 mm away, toward a shoulder of the tire, from the center of the width of the tread surface. Then, a puncture repair liquid (700 cc) was injected into the tire through an air pressure valve, and, after 10 minute drive at 30 km/h with the tire, air pressure of the tire was measured to check whether or not the air leaked. Five tires were tested for each of Example and Comparative Examples. Table 1 shows the number of tires in which no air leakage was observed.

TABLE 1

|  | Comparative Example 1 | Comparative Example 2 | Example 1 |
| --- | --- | --- | --- |
| Arrangement of tire noise reduction device | FIG. 6 | FIG. 6 | FIG. 1 |
| Number of tires without air leakage | 2 | 3 | 5 |

As shown in Table 1, the results show that no air leakage was caused at all in the tires of the present invention (Example 1). Note that the tires of Comparative Example 2 each having sound absorbing member attached by pressure on the inner surface of the tire showed a slightly improved air leakage prevention effect relative to the tires of Comparative Example 1 each having the sound absorbing member bonded by adhesion on the inner surface of the tire. It is assumed that this difference is caused by a slight amount of the puncture repair liquid which flowed, in Comparative Example 2, into the space between the sound absorbing member and the inner surface of the tire.

What is claimed is:

1. A tire noise reduction device to be mounted on an inner surface of a tread portion of a tire, the tire noise reduction device comprising:
    a sound absorbing member made of a porous material and having an annular shape; and
    a repair liquid permeable layer stacked in a thickness direction on an outer peripheral surface of the sound absorbing member, wherein
    the repair liquid permeable layer is formed of foaming resin having many continuous pores and a flow resistance lower than that of the porous material,
    the repair liquid permeable layer is arranged between the sound absorbing member and the inner surface of the tread portion of the tire, and
    the repair liquid permeable layer is divided into a plurality of sections arranged at predetermined intervals in a circumferential direction of the sound absorbing member,
    the sound absorbing member bridging between adjacent repair liquid permeable layer sections.

2. The tire noise reduction device according to claim 1, wherein a porosity of the repair liquid permeable layer is 60.0% to 99.5%.

3. The tire noise reduction device according to claim 1, wherein a thickness of the repair liquid permeable layer is 1.0 mm to 10 mm.

4. The tire noise reduction device according to claim 1, wherein the repair liquid permeable layer is subjected to a hydrophilic treatment.

5. The tire noise reduction device according to claim 1, wherein the sound absorbing member is subjected to a water repelling treatment.

6. The tire noise reduction device according to claim 1, wherein
    the sound absorbing member is divided into a plurality of separated bodies in a circumferential direction of the annular-shape, and
    the separated bodies are arranged in the circumferential direction at predetermined intervals.

7. The tire noise reduction device according to claim 1, wherein the sound absorbing member is fixed to an annular elastic band.

8. A pneumatic tire comprising the tire noise reduction device according to claim 1 mounted on an inner peripheral surface of a tread portion.

9. The pneumatic tire according to claim 8, wherein the tire noise reduction device is fixed on the inner peripheral surface of the tread portion by adhesion.

10. A pneumatic tire comprising the tire noise reduction device according to claim 7 mounted on an inner peripheral surface of a tread portion.

11. The tire noise reduction device according to claim 1, wherein the repair liquid permeable layer extends from an edge to the other edge in a tire-width direction of the sound absorbing member.

* * * * *